(12) United States Patent
Carter et al.

(10) Patent No.: US 10,685,538 B2
(45) Date of Patent: Jun. 16, 2020

(54) ALGORITHM IMPROVEMENTS IN A HAPTIC SYSTEM

(71) Applicant: ULTRAHAPTICS IP LTD, Bristol (GB)

(72) Inventors: Thomas Andrew Carter, Bristol (GB); Benjamin John Oliver Long, Bristol (GB); Sriram Subramanian, Hove (GB)

(73) Assignee: ULTRAHAPTICS IP LTD, Bristol (GB)

( * ) Notice: Subject to any disclaimer, the term of this patent is extended or adjusted under 35 U.S.C. 154(b) by 0 days.

(21) Appl. No.: 16/160,862

(22) Filed: Oct. 15, 2018

(65) Prior Publication Data

US 2019/0197841 A1      Jun. 27, 2019

Related U.S. Application Data

(63) Continuation of application No. 15/047,791, filed on Feb. 19, 2016, now Pat. No. 10,101,811.

(Continued)

(51) Int. Cl.
*G06F 3/00* (2006.01)
*G08B 6/00* (2006.01)
(Continued)

(52) U.S. Cl.
CPC ............... *G08B 6/00* (2013.01); *G06F 3/016* (2013.01); *G06F 3/038* (2013.01); *G10K 15/04* (2013.01); *H04R 1/40* (2013.01); *H04R 2217/03* (2013.01)

(58) Field of Classification Search
CPC . G08B 6/00; G06F 3/016; G06F 3/038; G06F 3/011; G06F 3/01; G06F 3/0412;
(Continued)

(56) References Cited

U.S. PATENT DOCUMENTS

| 4,218,921 A | 8/1980 | Berge |
| 4,771,205 A | 9/1988 | Mequio |

(Continued)

FOREIGN PATENT DOCUMENTS

| CN | 102591512 | 7/2012 |
| CN | 103797379 | 5/2014 |

(Continued)

OTHER PUBLICATIONS

Notice of Allowance dated Dec. 19, 2018 for U.S. Appl. No. 15/665,629 (pp. 1-9).

(Continued)

*Primary Examiner* — Ojiako K Nwugo
(74) *Attorney, Agent, or Firm* — Koffsky Schwalb LLC; Mark I. Koffsky

(57) ABSTRACT

A system providing various improved processing techniques for haptic feedback is described. An acoustic field is defined by one or more control points in a space within which the acoustic field may exist. Each control point is assigned an amplitude value equating to a desired amplitude of the acoustic field at the control point. Transducers are then controlled to create an acoustic field exhibiting the desired amplitude at each of the control points. When human skin interacts with the acoustic field, vibrations of the skin are interpreted by mechanoreceptors being excited and sending signals to the brain via the nervous system. Improved processing techniques allow for more efficient real-world operation.

5 Claims, 6 Drawing Sheets

Related U.S. Application Data

(60) Provisional application No. 62/275,002, filed on Jan. 5, 2016, provisional application No. 62/268,573, filed on Dec. 17, 2015, provisional application No. 62/193,194, filed on Jul. 16, 2015, provisional application No. 62/193,125, filed on Jul. 16, 2015, provisional application No. 62/141,935, filed on Apr. 2, 2015, provisional application No. 62/118,543, filed on Feb. 20, 2015.

(51) Int. Cl.
*H04R 1/40* (2006.01)
*G06F 3/038* (2013.01)
*G06F 3/01* (2006.01)
*G10K 15/04* (2006.01)

(58) Field of Classification Search
CPC .......... G06F 3/014; G10K 15/04; H04R 1/40; H04R 2217/03
USPC ............ 340/407.1, 407.3; 715/700–702, 757
See application file for complete search history.

(56) References Cited

U.S. PATENT DOCUMENTS

| | | | |
|---|---|---|---|
| 4,881,212 A | 11/1989 | Takeuchi | |
| 5,329,682 A | 7/1994 | Thurn | |
| 5,426,388 A | 6/1995 | Flora | |
| 5,511,296 A | 4/1996 | Dias | |
| 6,503,204 B1 | 1/2003 | Sumanaweera | |
| 6,647,359 B1 | 11/2003 | Verplank | |
| 6,772,490 B2 | 8/2004 | Toda | |
| 6,800,987 B2 | 10/2004 | Toda | |
| 7,109,789 B2 | 9/2006 | Spencer | |
| 7,225,404 B1 | 5/2007 | Zilles | |
| 8,269,168 B1 | 9/2012 | Axelrod | |
| 8,279,193 B1 | 10/2012 | Birnbaum | |
| 8,607,922 B1 | 12/2013 | Werner | |
| 8,833,510 B2 | 9/2014 | Koh | |
| 8,884,927 B1 | 11/2014 | Cheatham, III | |
| 9,208,664 B1 | 12/2015 | Peters | |
| 9,612,658 B2 | 4/2017 | Subramanian | |
| 9,662,680 B2 | 5/2017 | Yamamoto | |
| 9,841,819 B2 | 12/2017 | Carter | |
| 9,945,818 B2 | 4/2018 | Ganti | |
| 10,101,811 B2 * | 10/2018 | Carter | G06F 3/016 |
| 2002/0149570 A1 | 10/2002 | Knowles | |
| 2003/0024317 A1 | 2/2003 | Miller | |
| 2003/0144032 A1 | 7/2003 | Brunner | |
| 2004/0014434 A1 | 1/2004 | Haardt | |
| 2004/0091119 A1 | 5/2004 | Duraiswami | |
| 2004/0226378 A1 | 11/2004 | Oda | |
| 2004/0264707 A1 | 12/2004 | Yang | |
| 2005/0212760 A1 | 9/2005 | Marvit | |
| 2006/0085049 A1 | 4/2006 | Cory | |
| 2006/0091301 A1 | 5/2006 | Trisnadi | |
| 2007/0177681 A1 | 8/2007 | Choi | |
| 2008/0012647 A1 | 1/2008 | Risbo | |
| 2008/0273723 A1 | 11/2008 | Hartung | |
| 2008/0300055 A1 | 12/2008 | Lutnick | |
| 2009/0093724 A1 | 4/2009 | Pernot | |
| 2010/0013613 A1 | 1/2010 | Weston | |
| 2010/0085168 A1 | 4/2010 | Kyung | |
| 2010/0103246 A1 | 4/2010 | Schwerdtner | |
| 2010/0109481 A1 | 5/2010 | Buccafusca | |
| 2010/0262008 A1 | 10/2010 | Roundhill | |
| 2011/0051554 A1 | 3/2011 | Varray | |
| 2011/0199342 A1 | 8/2011 | Vartanian | |
| 2011/0310028 A1 | 12/2011 | Camp, Jr. | |
| 2012/0063628 A1 | 3/2012 | Rizzello | |
| 2012/0223880 A1 | 9/2012 | Birnbaum | |
| 2012/0229401 A1 | 9/2012 | Birnbaum | |
| 2012/0299853 A1 | 11/2012 | Dagar | |
| 2012/0307649 A1 | 12/2012 | Park | |
| 2012/0315605 A1 | 12/2012 | Cho | |
| 2013/0035582 A1 | 2/2013 | Radulescu | |
| 2013/0100008 A1 | 4/2013 | Marti | |
| 2013/0101141 A1 | 4/2013 | McElveen | |
| 2014/0027201 A1 | 1/2014 | Islam | |
| 2014/0168091 A1 | 6/2014 | Jones | |
| 2014/0265572 A1 | 9/2014 | Siedenburg | |
| 2015/0002477 A1 | 1/2015 | Cheatham, III | |
| 2015/0006645 A1 | 1/2015 | Oh | |
| 2015/0007025 A1 | 1/2015 | Sassi | |
| 2015/0013023 A1 | 1/2015 | Wang | |
| 2015/0066445 A1 | 3/2015 | Lin | |
| 2015/0070147 A1 | 3/2015 | Cruz-Hernandez | |
| 2015/0070245 A1 | 3/2015 | Han | |
| 2015/0110310 A1 | 4/2015 | Minnaar | |
| 2015/0130323 A1 | 5/2015 | Harris | |
| 2015/0168205 A1 | 6/2015 | Lee | |
| 2015/0192995 A1 * | 7/2015 | Subramanian | G06F 3/016 340/407.1 |
| 2015/0220199 A1 | 8/2015 | Wang | |
| 2015/0226537 A1 | 8/2015 | Schorre | |
| 2015/0226831 A1 | 8/2015 | Nakamura | |
| 2015/0248787 A1 | 9/2015 | Abovitz | |
| 2015/0277610 A1 | 10/2015 | Kim | |
| 2015/0304789 A1 | 10/2015 | Babayoff | |
| 2016/0019879 A1 | 1/2016 | Daley | |
| 2016/0044417 A1 | 2/2016 | Clemen, Jr. | |
| 2016/0124080 A1 * | 5/2016 | Carter | G01S 7/539 367/95 |
| 2016/0189702 A1 | 6/2016 | Blanc | |
| 2016/0242724 A1 | 8/2016 | Lavallee | |
| 2016/0246374 A1 | 8/2016 | Carter | |
| 2016/0249150 A1 | 8/2016 | Carter | |
| 2016/0320843 A1 | 11/2016 | Long | |
| 2017/0004819 A1 | 1/2017 | Ochiai | |
| 2017/0018171 A1 | 1/2017 | Carter | |
| 2017/0123499 A1 | 5/2017 | Eid | |
| 2017/0193768 A1 | 7/2017 | Long | |
| 2017/0193823 A1 | 7/2017 | Jiang | |
| 2018/0039333 A1 | 2/2018 | Carter | |
| 2018/0304310 A1 * | 10/2018 | Long | B06B 1/166 |
| 2018/0361174 A1 | 12/2018 | Radulescu | |

FOREIGN PATENT DOCUMENTS

| | | |
|---|---|---|
| CN | 103984414 A | 8/2014 |
| EP | 1911530 | 4/2008 |
| GB | 2464117 | 4/2010 |
| GB | 2513884 | 11/2014 |
| GB | 2513884 A | 11/2014 |
| GB | 2530036 | 3/2016 |
| JP | 2010109579 | 5/2010 |
| JP | 2011172074 | 9/2011 |
| JP | 2012048378 | 3/2012 |
| JP | 2016035646 | 3/2016 |
| KR | 20120065779 | 6/2012 |
| KR | 20130055972 | 5/2013 |
| KR | 20160008280 | 1/2016 |
| WO | 9118486 | 11/1991 |
| WO | 9639754 | 12/1996 |
| WO | 2005017965 | 2/2005 |
| WO | 2013179179 | 12/2013 |
| WO | 2014181084 | 11/2014 |
| WO | 2015006467 | 1/2015 |
| WO | 2015039622 | 3/2015 |
| WO | 2016007920 | 1/2016 |
| WO | 2016132141 A1 | 8/2016 |
| WO | 2016132144 | 8/2016 |
| WO | 2016132144 A1 | 8/2016 |
| WO | 2016137675 | 9/2016 |
| WO | 2016162058 | 10/2016 |

OTHER PUBLICATIONS

Notice of Allowance dated Dec. 21, 2018 for U.S. Appl. No. 15/983,864 (pp. 1-7).
Ex Parte Quayle Action dated Dec. 28, 2018 for U.S. Appl. No. 15/966,213 (pp. 1-7).

(56) References Cited

OTHER PUBLICATIONS

International Preliminary Report on Patentability and Written Opinion issued in corresponding PCT/US2017/035009, dated Dec. 4, 2018, 8 pages.
Notice of Allowance dated Feb. 7, 2019 for U.S. Appl. No. 15/851,214 (pp. 1-7).
Office Action dated Feb. 20, 2019 for U.S. Appl. No. 15/623,516 (pp. 1-8).
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Li, Larry, "Time-of-Flight Camera—An Introduction," Texas Instruments, Technical White Paper, SLOA190B—Jan. 2014 Revised May 2014, 10 pages.
Teixeira, et al., "A brief introduction to Microsoft's Kinect Sensor," Kinect, 26 pages., retrieved Nov. 2018.
Zeng, Wejun, "Microsoft Kinect Sensor and Its Effect," IEEE Multimedia, Apr.-Jun. 2012, 7 pages.
Kolb, et al., "Time-of-Flight Cameras in Computer Graphics," Computer Graphics forum, vol. 29 (2010), No. 1, pp. 141-159.
Iddan, et al., "3D Imaging in the Studio (and Elsewhwere . . . " Apr. 2001, 3DV systems Ltd., Yokneam, Isreal, www.3dvsystems.com.il, 9 pages.
Krim, et al., "Two Decades of Array Signal Processing Research—The Parametric Approach", IEEE Signal Processing Magazine, Jul. 1996, pp. 67-94.
Schmidt, Ralph, "Multiple Emitter Location and Signal Parameter Estimation" IEEE Transactions of Antenna and Propagation, vol. AP-34, No. 3, Mar. 1986, pp. 276-280.
Meijster, A., et al., "A General Algorithm for Computing Distance Transforms in Linear Time," Mathematical Morphology and its Applications to Image and Signal Processing, 2002, pp. 331-340.
Colgan, A., "How Does the Leap Motion Controller Work?" Leap Motion, Aug. 9, 2014, 10 pages.
Definition of "Interferometry" according to Wikipedia, 25 pages., Retrieved Nov. 2018.
Definition of "Multilateration" according to Wikipedia, 7 pages., Retrieved Nov. 2018.
Definition of "Trilateration" according to Wikipedia, 2 pages., Retrieved Nov. 2018.
"Welcome to Project Soli" video, https://atap.google.com/#project-soli Accessed Nov. 30, 2018, 2 pages.
Sixth Sense webpage, http://www.pranavmistry.com/projects/sixthsense/ Accessed Nov. 30, 2018, 7 pages.
Damn Geeky, "Virtual projection keyboard technology with haptic feedback on palm of your hand," May 30, 2013, 4 pages.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
PCT Partial International Search Report for Application No. PCT/GB2018/053404 dated Feb. 25, 2019, 13 pages.
Pompei, F.J. (2002), "Sound from Ultrasound: The Parametric Array as an Audible Sound Source", Massachusetts Institute of Technology (132 pages).
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Hoshi T et al, "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.

Yoshino, K. and Shinoda, H. (2013), "Visio Acoustic Screen for Contactless Touch Interface with Tactile Sensation", University of Tokyo (5 pages).
Kamakura, T. and Aoki, K. (2006) "A Highly Directional Audio System using a Parametric Array in Air" WESPAC IX 2006 (8 pages).
Alexander, J. et al. (2011), Adding Haptic Feedback to Mobile TV (6 pages).
Tom Carter et al, "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Search Report for GB1308274.8 dated Nov. 11, 2013. (2 pages).
Gavrilov L R et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
E.S. Ebbini et al. (1991), A spherical-section ultrasound phased array applicator for deep localized hyperthermia, Biomedical Engineering, IEEE Transactions on (vol. 38 Issue: 7), pp. 634-643.
Iwamoto T et al, "Two-dimensional Scanning Tactile Display using Ultrasound Radiation Pressure", Haptic Interfaces for Virtual Environment and Teleoperator Systems, 20 06 14th Symposium on Alexandria, VA, USA Mar. 25-26, 2006, Piscataway, NJ, USA,IEEE, (Mar. 25, 2006), ISBN 978-1-4244-0226-7, pp. 57-61.
Iwamoto et al. (2008), Non-contact Method for Producing Tactile Sensation Using Airborne Ultrasound, EuroHaptics, pp. 504-513.
Search report for PCT/GB2015/052578 dated Oct. 26, 2015 (12 pages).
Marzo et al., Holographic acoustic elements for manipulation of levitated objects, Nature Communications DOI: 10.1038/ncomms9661 (2015) (7 pages).
Search report for PCT/GB2014/051319 dated Dec. 8, 2014 (4 pages).
Search Report for GB1415923.0 dated Mar. 11, 2015. (1 page).
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Obrist et al., Talking about Tactile Experiences, CHI 2013, Apr. 27-May 2, 2013 (10 pages).
Benjamin Long et al, "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Freeman et al., Tactile Feedback for Above-Device Gesture Interfaces: Adding Touch to Touchless Interactions ICMI'14, Nov. 12-16, 2014, Istanbul, Turkey (8 pages).
Obrist et al., Emotions Mediated Through Mid-Air Haptics, CHI 2015, Apr. 18-23, 2015, Seoul, Republic of Korea. (10 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Phys.org, Touchable Hologram Becomes Reality, Aug. 6, 2009, by Lisa Zyga (2 pages).
Iwamoto et al., Airborne Ultrasound Tactile Display: Supplement, The University of Tokyo 2008 (2 pages).
Hoshi, T., Development of Aerial-Input and Aerial-Tactile-Feedback System, IEEE World Haptics Conference 2011, p. 569-573.
EPSRC Grant summary EP/J004448/1 (2011) (1 page).
Hoshi, T., Handwriting Transmission System Using Noncontact Tactile Display, IEEE Haptics Symposium 2012 pp. 399-401.

(56) References Cited

OTHER PUBLICATIONS

Takahashi, M. et al., Large Aperture Airborne Ultrasound Tactile Display Using Distributed Array Units, SICE Annual Conference 2010 p. 359-62.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Tom Nelligan and Dan Kass, Intro to Ultrasonic Phased Array (date unknown) (8 pages).
Light, E.D., Progress in Two Dimensional Arrays for Real Time Volumetric Imaging, 1998 (17 pages).
Casper et al., Realtime Control of Multiple-focus Phased Array Heating Patterns Based on Noninvasive Ultrasound Thermography, IEEE Trans Biomed Eng. Jan. 2012; 59(1): 95-105.
Hoshi, T., Touchable Holography, SIGGRAPH 2009, New Orleans, Louisiana, Aug. 3-7, 2009. (1 page).
Sylvia Gebhardt, Ultrasonic Transducer Arrays for Particle Manipulation (date unknown) (2 pages).
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017.
Oscar Martínez-Graullera et al, "2D array design based on Fermat spiral for ultrasound imaging", Ultrasonics, (Feb. 1, 2010), vol. 50, No. 2, ISSN 0041-624X, pp. 280-289, XP055210119.
Search Report for PCT/GB2017/052332 dated Oct. 10, 2017 (12 pages).
A. Sand, Head-Mounted Display with Mid-Air Tactile Feedback, Proceedings of the 21st ACM Symposium on Virtual Reality Software and Technology, Nov. 13-15, 2015 (8 pages).
E. Bok, Metasurface for Water-to-Air Sound Transmission, Physical Review Letters 120, 044302 (2018) (6 pages).
K. Jia, Dynamic properties of micro-particles in ultrasonic transportation using phase-controlled standing waves, J. Applied Physics 116, n. 16 (2014) (12 pages).
Marco A B Andrade et al, "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
M. Barmatz et al, "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Search Report for PCT/GB/2017/053729 dated Mar. 15, 2018 (16 pages).
Search Report for PCT/GB/2017/053880 dated Mar. 21, 2018. (13 pages).
Xin Cheng et al, "Computation of the acoustic radiation force on a sphere based on the 3-D FDTD method", Piezoelectricity, Acoustic Waves and Device Applications (SPAWDA), 2010 Symposium on, IEEE, (Dec. 10, 2010), ISBN 978-1-4244-9822-2, pp. 236-239.

Yang Ling et al, "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Search report for PCT/US2018/028966 dated Jul. 13, 2018 (43 pages).
Search report for PCT/GB2018/051061 dated Sep. 26, 2018 (17 pages).
EPO Office Action for EP16708440.9 dated Sep. 12, 2018 (7 pages).
Corrected Notice of Allowability dated Jun. 21, 2019 for U.S. Appl. No. 15/966,213 (2 pages).
International Search Report and Written Opinion for Application No. PCT/GB2018/053739, dated Jun. 4, 2019, 16 pages.
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
International Preliminary Report on Patentability for Application No. PCT/EP2017/069569 dated Feb. 5, 2019, 11 pages.
Japanese Office Action (with English language translation) for Application No. 2017-514569, dated Mar. 31, 3019, 10 pages.
Notice of Allowance dated May 30, 2019 for U.S. Appl. No. 15/966,213 (pp. 1-9).
Office Action dated Apr. 18, 2019 for U.S. Appl. No. 16/296,127 (pp. 1-6).
Office Action dated Apr. 4, 2019 for U.S. Appl. No. 15/897,804 (pp. 1-10).
Office Action dated May 16, 2019 for U.S. Appl. No. 15/396,851 (pp. 1-7).
Steve Guest et al., "Audiotactile interactions in roughness perception", Exp. Brain Res (2002) 146:161-171, DOI 10.1007/s00221-002-1164-z, /Accepted: May 16, 2002/ Published online: Jul. 26, 2002, Springer-Verlag 2002, (11 pages).
Corrected Notice of Allowability dated Oct. 31, 2019 for U.S. Appl. No. 15/623,516 (pp. 1-2).
Extended European Search Report for Application No. EP19169929.7, dated Aug. 6, 2019, 7 pages.
International Search Report and Written Opinion for Application No. PCT/GB2019/050969, dated Jun. 13, 2019, 15 pages.
Office Action dated Oct. 17, 2019 for U.S. Appl. No. 15/897,804 (pp. 1-10).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).

\* cited by examiner

ALGORITHM IMPROVEMENTS IN A HAPTIC SYSTEM

RELATED APPLICATION

This application claims the benefit of the following six U.S. Provisional Patent Applications, all of which are incorporated by reference in their entirety:
1. Ser. No. 62/118,543, filed on Feb. 20, 2015.
2. Ser. No. 62/141,935, filed on Apr. 2, 2015.
3. Ser. No. 62/193,125, filed on Jul. 16, 2015.
4. Ser. No. 62/193,194, filed on Jul. 16, 2015.
5. Ser. No. 62/268,573, filed on Dec. 17, 2015.
6. Ser. No. 62/275,002, filed on Jan. 5, 2016.

FIELD OF THE DISCLOSURE

The present disclosure relates generally to an improved algorithm processing techniques in haptic-based systems.

BACKGROUND

It is known to use a continuous distribution of sound energy, which will be referred to herein as an "acoustic field", for a range of applications, including haptic feedback.

It is known to control an acoustic field by defining one or more control points in a space within which the acoustic field may exist. Each control point is assigned an amplitude value equating to a desired amplitude of the acoustic field at the control point. Transducers are then controlled to create an acoustic field exhibiting the desired amplitude at each of the control points. When human skin interacts with the acoustic field, vibrations of the skin are interpreted by mechanoreceptors being excited and sending signals to the brain via the nervous system.

When used in mid-air, haptic technology works by focusing sound at an ultrasonic carrier frequency to a point or points in the space above the transducers. Then this is modulated by a low frequency wave that generates the haptic sensation.

Nonetheless, real-world implementation of haptic feedback systems may require processing improvements in order to better simulate desired haptic feedback characteristics in real time. Known systems suffer from limitations, in that it is difficult to account for many control points at once while achieving fast update rates for the state of the transducers, acoustic field and therefore control points. Fast and efficient updates are required for a commercially viable system.

Accordingly, a system that provides various improved processing techniques for haptic feedback is desirable.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
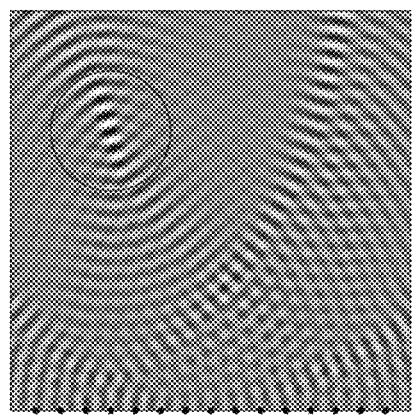
FIG. 1 is a snapshot of a series of devices producing a single carrier frequency.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Focusing with Multiple Frequencies in a Haptic System

A simple example with a single focus can be obtained by calculating the distance from the point where the focus is to be created to each transducer. Then this distance is divided by the wavelength and the fractional part multiplied by the period to find the delay such that all the waves arrive together. For small devices, the ultrasonic carrier frequency implies a wavelength that is small compared to the variation in transducer to desired focus point distances. Focusing is thus required to ensure a strong signal at a point. For small devices, this is not the case for the wavelength of the modulation frequency. The wavelength of the modulation frequency is large compared to the variation in transducer to desired focus point distance, so the modulation frequency can be simply synchronized.

For some larger form factors, such as, for example, a TV sound bar, this is not the case. The modulation frequency will fall out of phase in the haptic region, mixing the acoustic field states and weakening the feedback. The problem can be solved by applying a multipoint focusing scheme to both the carrier and modulated wave allows multiple sets of strong feedback points are produced at large separations at a large distance from the device.

The first step is to segment the system of focal points in the carrier frequency into regions, which can fit within the focal areas of the modulation frequency. These are necessarily in the order of half a wavelength of the modulation frequency in diameter. Since the aim is to ensure that the modulation frequency is in-phase in the feedback area, both phase and anti-phase two-sided modulations must fit inside the modulation frequency focal area.

Next, the system is applied to produce modulation frequency phase offsets for all modulation frequency focal areas. It is now possible to solve for the ultrasonic phase offsets for the multi-point focus system at the carrier frequency as normal. Because the modulation is in phase, the modulation will behave normally just as in a smaller array.

Figure 2:
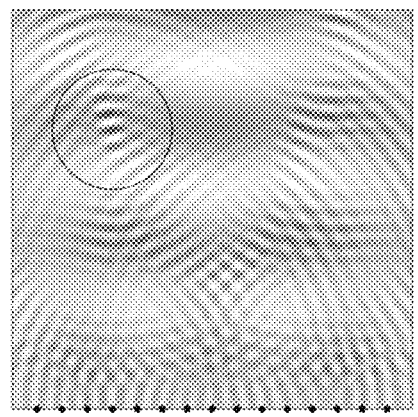
FIG. 2 is a snapshot of a series of devices illustrating the disruptive effect on the focus shown in FIG. 1.
Figure 3:
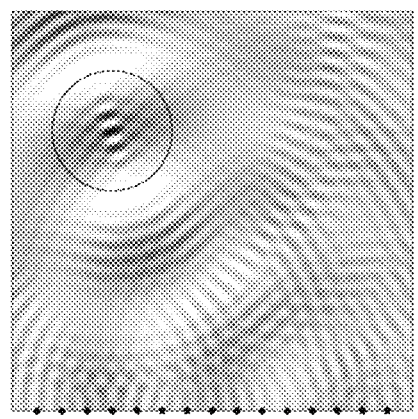
FIG. 3 is a snapshot of a series of devices showing the creation of a focal area where the modulation frequency is focused.

In the accompanying FIGS. 1-3, simulation snapshots of acoustic fields have been chosen to comparably evaluate the strength of three focusing approaches. The small filled black circles along the edge of each figure represent transducer elements that have been configured to reproduce a control point. The diameter of the inset circle in each snapshot is the wavelength of the modulation frequency.

FIG. 1 illustrates a snapshot of a device producing a single carrier frequency, focusing to a point (shown in the inset circle). The device has been configured to produce a focus at the center of the circle using the simple example above.

FIG. 2 is a snapshot that illustrates the disruptive effect on the focus (shown in the inset circle) based on FIG. 1 when a lower frequency modulation is applied synchronously to all transducers. This is the usual approach for small constellations of transducers. In this case however, the modulation frequency wavelength is similar to or smaller than the difference in line of sight length from a control point to each emitting device. This results in reduced contrast in the wave at the focus, revealing a weaker haptic response.

FIG. 3 shows the proposed solution: a snapshot showing the creation of a focal area (shown in the inset circle) where the modulation frequency is focused. This is accomplished by applying both the proposed modulation focusing and the focusing of the carrier frequency to the device in parallel, which restores strength to the control point at the focus.

The technique as shown in FIG. 3 is not limited to ensuring that the carrier and modulated frequencies behave correctly. An input audible sound can be filtered to make it suitable for ultrasonic projection before being split into its component frequencies such as when a Fourier transform is employed. These individual frequencies can be focused at a point to generate a non-linear breakdown causing sound to be generated at the point. If the component frequencies are shared, they may be generated in different configurations in different places allowing multiple sounds to be created in different and discrete positions. As the human ear is not sensitive to phase, the phase solver can be applied and the relative phase randomized without degradation of the system. There may be a discrimination condition between frequencies containing phase information that encodes structure that should not be modified and phase information that can be modified.

II. Amplitude Multiplexing with Dominant Eigenvectors in a Haptic System

It is useful to provide a system and method for providing improved haptic feedback using amplitude multiplexing with a dominant eigenvector.

A. Optimal Single Control Point Solution

The optimal solution for a single control point can be derived from first principles by algebraically solving a linear system Ax=b, where A is the 1×n linear system of wave function superpositions (essentially a row vector). This system reflects a system with a single control point at the position $\chi_c$ with the intended behavior of the acoustic field (amplitude and phase) at that point represented by the complex coefficient $Y_c$:

$$[Z_1(X_c) \ldots Z_n(X_c)] \begin{bmatrix} Y_1 \\ \vdots \\ Y_n \end{bmatrix} = Y_c \quad \text{[Equation 1]}$$

where $Z_1(\chi_c) \ldots Z_n(\chi_c)$ are the acoustic field wave functions created by single frequency sound emissions from emitters $1, \ldots, n$ and $Y_1, \ldots, Y_n$ (the vector x) are the complex activation coefficients that solve the linear system. $Y_c$ (the vector b) is the intended wave function behavior (amplitude and phase) at the control point.

The minimum norm solution to a linear system, in this case the solution with the lowest required activation amplitudes, can be found by pre-multiplying the matrix with the Moore-Penrose pseudoinverse. The complex linear system Ax=b then has a solution with lowest activation amplitudes given by $x=A^H(AA^H)^{-1}b$. The activation coefficient for a given emitter q can then be written as:

$$Y_q = \frac{\overline{Z_q(X_c)} Y_c}{Z_1(X_c)\overline{Z_1(X_c)} + \ldots + Z_n(X_c)\overline{Z_n(X_c)}} \quad \text{[Equation 2]}$$

where the overline denotes complex conjugation.

B. Generic Emitter to Specific Transducer

Rather than using a separate function for each emitter, if the transducers are emitting into free space a single template wave function can be created to represent each transducer by using a 4×4 matrix transform $T_q$ into the space of the template transducer (denoted *). The transducer function for a zero phase offset and unit amplitude may be written as:

$$\Psi_q(\chi)=Z_*(T_q\chi) \quad \text{[Equation 3]}$$

so that changes to the amplitudes and phases of the transducers can be represented by multiplying this wave function by a complex constant.

C. Finding Localized Effects

A control point has both amplitude and phase. For haptic applications, the phase is immaterial, and so it can be used to find the best way to create the desired amplitudes at the control points in space.

The control point activation $Y_c$ is represented as a complex value $A_c e^{i\Phi_c}$. To find the effect that the activation of a control point has on its neighbors, the amplitude and phase offset must be set to a reference point, such as a unit amplitude on the real line. As the control point has unit amplitude and zero phase offset, this control point will be denoted C0. Defining $\alpha_{C0}=[\Psi_1(\chi_c) \ldots, \Psi_n(\chi_c)]$, the vector of transducer activation coefficients Y for the control point C0 can be written as:

$$Y_{C0} = \frac{\overline{\alpha_{C0}}}{\alpha_{C0} \cdot \overline{\alpha_{C0}}} \quad \text{[Equation 4]}$$

Given an activation coefficient for a transducer $Y_q$ the effect that activating transducer q with the coefficient calculated from control point C0 has on another given point $\chi_O$, may be found as $\dot\Psi_{q;C0}(\chi_O)=Y_{q;C0}\Psi_q(\chi_O)$. Using this, the total effect that 'activating' a control point of amplitude $A_C$ has on any other control point, as the summed effect at the point $\chi_O$ would then be:

$$\Psi_{\Omega;C0}(X_0) = \frac{\overline{\alpha_{C0}} A_c \cdot \alpha_0}{\alpha_{C0} \cdot \overline{\alpha_{C0}}} \quad \text{[Equation 5]}$$

D. Control Point Relations Matrix

To create many control points at the same time, it must be considered how they impact each other and find a solution in which they cause beneficial and not unwanted, detrimental interference.

Sets of simple unit amplitude and zero offset activation coefficients for each of the m control points under consideration were established. They are written $\alpha_{C0_1}, \ldots, \alpha_{C0_m}$. The amplitude for the individual control points is defined as $A_{c_1}, \ldots, A_{c_m}$. If a vector k is defined as $$k = \left[ \frac{1}{\alpha_{C0_1} \cdot \overline{\alpha_{C0_1}}}, \ldots, \frac{1}{\alpha_{C0_m} \cdot \overline{\alpha_{C0_m}}} \right],$$

the control point relations matrix is:

$$R = \begin{bmatrix} A_{c_1} & \cdots & \frac{A_{c_r} k_r}{(\overline{\alpha_{C0_r}} \cdot \alpha_{C0_1})} & \cdots & \frac{A_{c_m} k_m}{(\overline{\alpha_{C0_m}} \cdot \alpha_{C0_1})} \\ \vdots & \ddots & \vdots & \ddots & \vdots \\ \frac{A_{c_1} k_1}{(\overline{\alpha_{C0_1}} \cdot \alpha_{C0_r})} & \cdots & A_{c_r} & \cdots & \frac{A_{c_m} k_m}{(\overline{\alpha_{C0_m}} \cdot \alpha_{C0_r})} \\ \vdots & \ddots & \vdots & \ddots & \vdots \\ \frac{A_{c_1} k_1}{(\overline{\alpha_{C0_1}} \cdot \alpha_{C0_m})} & \cdots & \frac{A_{c_r} k_r}{(\overline{\alpha_{C0_r}} \cdot \alpha_{C0_m})} & \cdots & A_{c_m} \end{bmatrix} \quad \text{[Equation 6]}$$

This matrix is a very small square matrix which has m×m entries when m control points are considered, so the eigensystem evaluation does not involve many computations. Then the eigensystem $Rx = \lambda x$ has eigenvectors x. Eigenvectors of this matrix represent control point activation coefficients that result in interference such that the set of control points activation coefficients remain steady and do not effect relative changes in the acoustic field. When the eigenvalue $\lambda$ is large, this represents a set of points with increased gain, and when it is small, the strength of these control points is reduced.

A simple algorithm for determining eigenvalues is the power iteration, wherein an arbitrary non-zero sample vector is multiplied and then normalized iteratively. As there is a primary interest in the eigenvector with the largest eigenvalue, the most simple iteration available suffices:

$$x = \hat{x}_{big}, \quad x_{big} = \lim_{s \to \infty} R^s x_{random} \quad \text{[Equation 7]}$$

Having achieved this x by normalizing and multiplying by the matrix R many times, each complex number is normalized so that the eigenvector weights do not affect the control point strength unnecessarily. This generates:

$$\hat{x}_r = \frac{x_r}{\sqrt{x_r \overline{x}_r}} \quad \text{[Equation 8]}$$

E. Amplitude Multiplexing with the Dominant Eigenvector

The activation coefficients for each transducer q can be expressed by linearly multiplexing in amplitude the control power activation coefficients:

$$Y_{q;\Omega C} \propto \sum_{r=1}^{m} \overline{\alpha_{C0_{r,q}}} A_{c_r} x'_r k_r \quad \text{[Equation 9]}$$

To achieve real transducer activation coefficients, the power levels must be normalized to those producible by real hardware. This can be achieved by dividing through by the maximum intensity to produce correctly weighted control points:

$$\hat{Y}_{q;\Omega C} = \frac{\sum_{r=1}^{m} \overline{\alpha_{C0_{r,q}}} A_{c_r} x'_r k_r}{\max_{\substack{n \\ q=1}} \left\| \sum_{r=1}^{m} \overline{\alpha_{C0_{r,\hat{q}}}} A_{c_r} k_r \right\|} \quad \text{[Equation 10]}$$

Or, if it is acceptable to accept some error in the relative strengths of control points the transducer coefficients may be normalized more simply as:

$$\hat{Y}_{q;\Omega C} = \frac{\sum_{r=1}^{m} \overline{\alpha_{C0_{r,q}}} A_{c_r} x'_r k_r}{\left\| \sum_{r=1}^{m} \overline{\alpha_{C0_{r,q}}} A_{c_r} k_r \right\|} \quad \text{[Equation 11]}$$

Using these solutions, the physical transducers can be actuated such that the desired control points exist in the field at the desired amplitude.

These solutions for the effect of a single control point on another are optimal for the situation in which the control point contributions are summed and normalized. Even though the plain linear combination of control points does not perform well when the set of control points is large, by solving the eigensystem and using the combinations of complex coefficients large sets of control points may generate many hundreds of times faster than before. Further, the eigensystem solution eliminates the drawbacks to the linear combination that prevented these solutions being useful previously.

F. Testing

To ascertain the differences in speed and effectiveness for complex shapes, the following provides runtime analysis and simulated acoustic fields.

The computational speed tests given in Table 1 were produced using a stress testing application that runs control point solutions for a set of points randomly generated in a plane above the array.

The left column of Table 1 shows the number of control points used for the computational speed tests.

The center column of Table 1 labeled "new" shows the number of milliseconds it took to find a set of complex transducer inputs to generate an acoustic field containing the given number of control points using the linear control point amplitude multiplexing with the dominant eigenvector as described herein. This computation took place using a 2.5 GHz Intel Core i7-4870HQ CPU in a single-threaded mode.

The right column of Table 1 labeled "old" shows the number of milliseconds it took find a set of complex transducer inputs to generate an acoustic field containing the given number of control points using the older full linear system with the dominant eigenvector. This computation took place using a 2.5 GHz Intel Core i7-4870HQ CPU using the whole CPU.

TABLE 1

| Control points | New (ms) | Old (ms) |
| --- | --- | --- |
| 1 | 0.00822 | 4.30 |
| 2 | 0.0110 | 6.28 |
| 3 | 0.0136 | 9.27 |
| 4 | 0.0159 | 10.9 |
| 5 | 0.0195 | 12.5 |
| 6 | 0.0226 | 13.7 |
| 7 | 0.0254 | 15.4 |
| 8 | 0.0286 | 16.2 |
| 9 | 0.0337 | 17.7 |
| 10 | 0.0372 | 18.6 |
| 11 | 0.0407 | 20.1 |
| 13 | 0.0607 | 22.0 |
| 14 | 0.0536 | 23.1 |
| 16 | 0.0766 | 25.9 |
| 18 | 0.0850 | 28.3 |
| 20 | 0.0886 | 30.6 |
| 22 | 0.106 | 33.4 |
| 25 | 0.135 | 36.8 |
| 28 | 0.146 | 42.0 |
| 32 | 0.179 | 47.1 |
| 35 | 0.211 | 52.4 |
| 40 | 0.263 | 59.9 |
| 45 | 0.343 | 70.1 |
| 50 | 0.507 | 79.6 |

Figure 4:
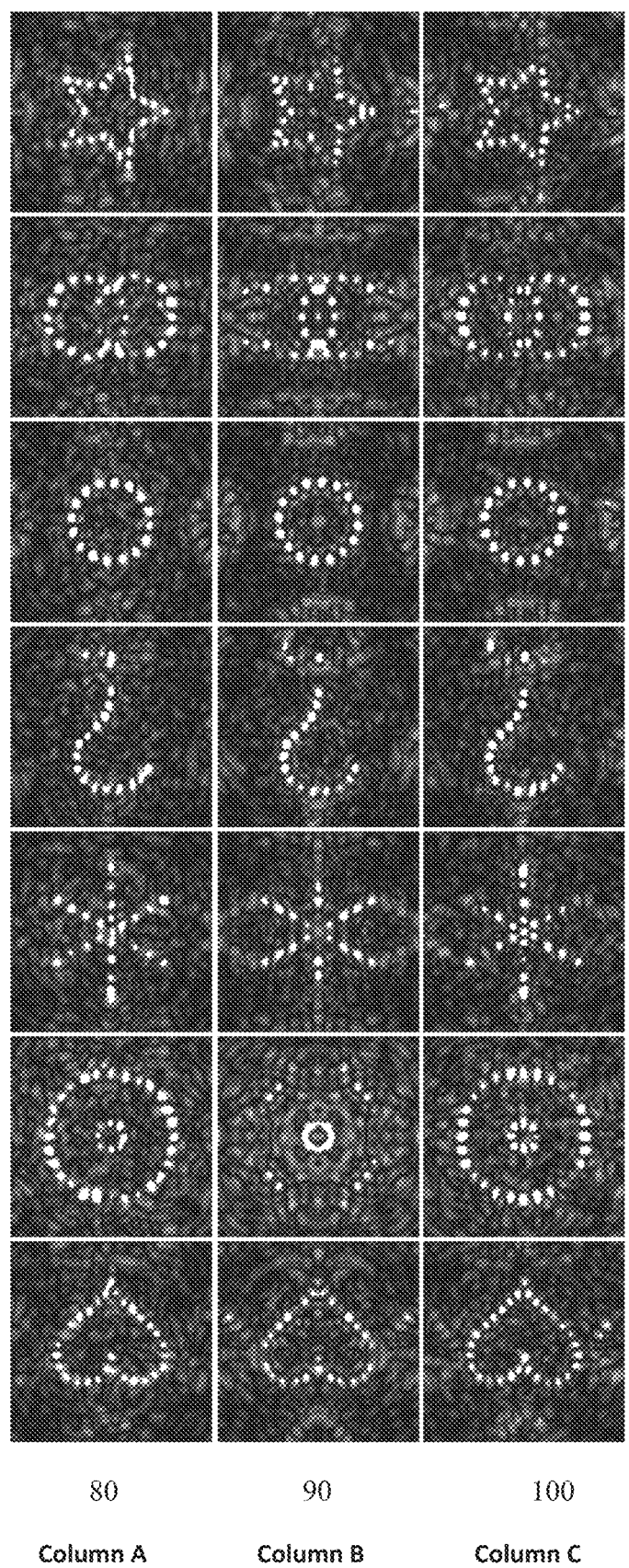
FIG. 4 is a montage of rows of the same shapes produced by taking slices of a simulation of the acoustic field.

Further testing is shown at FIG. 4, which is a montage of rows 10, 20, 30, 40, 50, 60, 70 of the same shapes produced by taking slices of a simulation of the acoustic field. The level of gray corresponds to the amplitude. High points in amplitude are highlighted in white instead of gray. Column A 80 shows the result of the linear system solution "old" method that produces accurate shapes. Column B 90 shows the result of the amplitude multiplexing "old" method without weighting by the dominant eigenvector. As can be seen, this produces bad quality results in many cases. Column C 100 shows the result of the amplitude multiplexing method with weighting by the dominant eigenvector (the new method disclosed herein).

G. Resource Constrained Scenarios

The algorithm discussed above may be split into three stages. The first stage (the "single point stage") computes the optimal unit amplitude and zero phase offset control points for the given control point locations and stores the appropriate optimal transducer activation vectors for each single point. The second stage (the "eigensystem stage") uses dot products to generate the eigensystem matrix and multiplies it with an arbitrary non-zero vector until an approximation to the eigenvector is obtained. The third stage (the "combination stage") sums up the dominant eigenvector weighted contributions from each of the single points into the final transducer activation coefficient vector needed to create the desired acoustic field with the physical transducers.

The computational operations required must be understood before the algorithm can be moved to low cost devices. The first stage requires many square root, sine and cosine evaluations to build a model of the acoustic waves emitted from the transducers. The second stage requires many matrix multiplications, but also many small but resource-costly vector normalizations. The third stage also requires normalization.

Transducer inputs calculated in the first stage can be precomputed in some instances to remove the computational cost of building the acoustic model for each control point. Particular combinations of control points can be precomputed so that their dominant eigenvectors are already available to the later combination stage. Either precomputation or caching can be done at determined or designed "hotspots." This can be achieved for pair or groups, depending on the design of the interactions involved. When the final contributions of the transducers inputs are cached, they can be made close enough together that an interpolation in the space of transducer activation coefficients can be perceived as a spatial linear motion of the control points from one precomputed setting to another.

III. Reducing Requirements for Machines Solving for Control Points in Haptic Systems In order to create a commercially viable system, the methods for calculating the transducer output to produce many control points must be streamlined so that they may be implementable on smaller microcontrollers and are able achieve a more responsive update rate to enhance interactivity and the user experience.

A. Merged Eigensystem Calculation

It is known that an eigensystem that encodes the influence of control points on each other can be used to determine control point phase configurations that reinforce each other, relatively boosting their output and increasing the efficiency of the transducer array.

It has been previously shown that this eigensystem can be described by the matrix:

$$R = \begin{bmatrix} A_{c_1} & \cdots & \frac{A_{c_r} k_r}{(\overline{\alpha_{C0_r}} \cdot \alpha_{C0_1})} & \cdots & \frac{A_{c_m} k_m}{(\overline{\alpha_{C0_m}} \cdot \alpha_{C0_1})} \\ \vdots & \ddots & \vdots & \ddots & \vdots \\ \frac{A_{c_1} k_1}{(\overline{\alpha_{C0_1}} \cdot \alpha_{C0_r})} & \cdots & A_{c_r} & \cdots & \frac{A_{c_m} k_m}{(\overline{\alpha_{C0_m}} \cdot \alpha_{C0_r})} \\ \vdots & \ddots & \vdots & \ddots & \vdots \\ \frac{A_{c_1} k_1}{(\overline{\alpha_{C0_1}} \cdot \alpha_{C0_m})} & \cdots & \frac{A_{c_r} k_r}{(\overline{\alpha_{C0_r}} \cdot \alpha_{C0_m})} & \cdots & A_{c_m} \end{bmatrix}$$ [Equation 12]

where $\alpha_{C0_1}, \ldots, \alpha_{C0_m}$ are zero offset activation coefficients, $A_{c_1}, \ldots, A_{c_m}$ are amplitudes for the individual control points and a vector k is shorthand for $$\left[ \frac{1}{\alpha_{C0_1} \cdot \overline{\alpha_{C0_1}}}, \cdots, \frac{1}{\alpha_{C0_m} \cdot \overline{\alpha_{C0_m}}} \right].$$

The linear system algorithm can be used as a subsequent calculation step as a method to solve a system of linear equations that describe the vector of transducer activation coefficients of least norm (lowest power requirements) that produce a set of control points with a given amplitude and phase offset. This phase offset may have been previously computed by the eigensystem.

A known method of achieving this linear system solution is via a Cholesky decomposition of a matrix. But to transform the matrix into the appropriate form for a Cholesky decomposition, it must be multiplied by its conjugate transpose to put it into a positive semi-definite form prior to taking the decomposition.

For the matrix of individual transducer output samples to calculate the final transducer activation coefficients, the result of taking it to this form can be described by:

$$C = \begin{bmatrix} \alpha_{c_{o_1}} \cdot \overline{\alpha_{c_{o_1}}} & \cdots & \alpha_{c_{o_1}} \cdot \overline{\alpha_{c_{o_r}}} & \cdots & \alpha_{c_{o_1}} \cdot \overline{\alpha_{c_{o_m}}} \\ \vdots & \ddots & \vdots & \cdot{\cdot}^{\cdot} & \vdots \\ \alpha_{c_{o_r}} \cdot \overline{\alpha_{c_{o_1}}} & \cdots & \alpha_{c_{o_r}} \cdot \overline{\alpha_{c_{o_r}}} & \cdots & \alpha_{c_{o_r}} \cdot \overline{\alpha_{c_{o_m}}} \\ \vdots & \cdot{\cdot}^{\cdot} & \vdots & \ddots & \vdots \\ \alpha_{c_{o_m}} \cdot \overline{\alpha_{c_{o_1}}} & \cdots & \alpha_{c_{o_m}} \cdot \overline{\alpha_{c_{o_r}}} & \cdots & \alpha_{c_{o_m}} \cdot \overline{\alpha_{c_{o_m}}} \end{bmatrix}. \quad \text{[Equation 13]}$$

It can be recognized that the previous eigensystem matrix R can be easily derived from this matrix C by post-multiplying by a diagonal matrix with trace $[A_{c_1}k_1, \ldots, A_{c_m}k_m]$. Since this is a small matrix compared to the length of the zero offset activation coefficients vectors $\alpha_{c_{o_1}}, \ldots, \alpha_{c_{o_m}}$, computing this only once results in a large speed improvement to the linear system based technique that once again makes it competitive with amplitude multiplexing for systems in which the matrix C is small.

B. Computation Sharing for Reduced Bandwidth and Latency.

In the known amplitude multiplexing technique, the final step is to reconstitute the eigenvector length outputs into transducer activation coefficients by multiplying each coefficient by the optimal solution, which is a reweighting of the conjugated evaluation of the wave function representing the output of all individual transducers at that point in space. By considering the least norm solution of the transducer activation coefficients via the Cholesky decomposition, all possible optimal solutions lie within a readily predictable and linear m-dimensional space. Further, this shows a method to use this fact to broadcast low bandwidth and thus low latency solutions to a set of devices that control known transducer constellations. As direct information regarding the transducer constellations does not need to be transmitted, this can result in multiple orders of magnitude increase in available bandwidth. In this way, large sets of synchronized devices are created that do not need to communicate but can co-operate to produce an acoustic field that can update at high frequency. If the update rate frequency is greater than an audible frequency, this presents an alternative mechanism to producing reduced audible output, which is desirable in a commercial system.

This can be achieved because the production of the focal points is by virtue of being soluble by a linear system linearly related to the output of the transducer elements. This means that the sinusoidal transducer input signal approach to making an array exhibit reduced noise can also be implemented by creating sinusoid-modulated control points and updating them at a rate faster than twice the frequency. This method has the advantage that multiple frequencies can be used together but has the drawback that it requires a much faster solving speed, tighter timing requirements and more available bandwidth than the other approach. This technique makes this approach viable on embedded systems.

The linear system solution of minimum norm is a method to obtain the lowest power transducer activation coefficient vector that reproduces a set of control points within the acoustic field. Using the least norm Cholesky decomposition method, to solve a linear system Ax=b, the substitution $A^H z=x$ is applied to produce the equation $AA^H z=b$ which is amenable to solution. This new solution vector z is a complex vector in an m-dimensional space is far smaller, and yet fully describes the solution. It is known that the rows of the matrix $A^H$ correspond to transducer activation vectors proportional to the optimal single control point solutions and so the output from the eigensystem and amplitude multiplexing technique can be also interpreted as a vector belonging to this vector space. The result vector from any solution system can also be projected into this smaller vector space and benefit from this solution.

This smaller vector is more suitable for transmission across a bandwidth-constrained link. On the far end of the link, a further less-flexible pipeline can decompress this reduced vector into the relevant portion of the x solution, then convert and output it to the transducer elements.

This can be achieved by, for example, transmitting the co-ordinates of the control point in order to recreate on the inflexible part of the pipeline the appropriate block of the matrix $A^H$. This could then imply a transmission of a 3D co-ordinate followed by a real and imaginary component for the corresponding element of the solution vector z. From this, the block of the matrix $A^H$ could be reconstructed and the complex activation coefficient for each transducer computed and output.

C. Reduced Dimensionality of Transducer Vectors.

As described in the previous sections the number of transducers and thus the length of the zero offset activation coefficients vectors $\alpha_{c_{o_1}}, \ldots, \alpha_{c_{o_m}}$ can be large. Both the eigensystem and the semi-positive definite C matrix described above are the result of vastly reducing the number of dimensions from the transducer count to m.

As the Cholesky decomposition takes the equation Ax=b and produces a solution z where $AA^H z=b$, followed by a reconstruction of the x vector as $x=A^H z$ due to the dimensionality, the first step to compute z can be constructed assuming a decimated or simplified transducer set. The two steps would then be $(A')(A')^H z=b$ followed by $x=A^H z$ using the full A matrix. This simplified A' can, for example, contain information about every second transducer or can be computed to model transducers grouped together and actuated as a single unit.

Thus, the number of transducers can be lowered in order to provide a speed up in exchange for some small degradation in performance. The full count of transducers can be calculated and added back in later in the solution procedure, after the coefficient data has been moved onto the parallel disparate processing on the less flexible pipeline closer to the transducer output.

IV. Modulated Pattern Focusing and Grouped Transducers in Haptic Systems

The optimal conditions for producing an acoustic field of a single frequency may be realized by assigning activation coefficients to represent the initial state of each transducer. As the field is monochromatic, these complex-valued activation coefficients uniquely define the acoustic field of the carrier frequency for "all time". However, in order to create haptic feedback, the field must be modulated with a signal of a potentially lower frequency. For example, an acoustic field of 40 kHz may be modulated with a 200 Hz frequency in order to achieve a 200 Hz vibrotactile effect. This complicates the model, as the assumptions that the patterns of transducer activations will hold for "all time" is violated. The result is that when the path length between each transducer and a given control point sufficiently differs, the waves will not coincide correctly at the control point; they will instead reach the control point at different times and not interfere as intended. This is not a serious problem when the change in path length is small or the modulation wave is of very low frequency. But this results in spatial-temporal aliasing that will reduce the power and definition of the control points as they are felt haptically.

It is known that to remedy this, a second focusing solution can be used to create a double focusing of both the carrier and the modulated wave. However, there is no simple way to apply the second focusing to the field that does not cause discontinuities in the form of audible clicks and pops. This also does not easily extend to the situation in which the modulated wave has no discernable frequency.

The second focusing 'activation coefficient' for the modulation frequency can be used to compute an offset in time from the resulting complex value. This offset can be smoothly interpolated for each transducer, resulting in an output that can take advantage of the second focusing and be free from audible artifacts.

Due to relatively low frequency nature of the modulated content, using groupings of transducers that have small differences in path length can lead to a useful trade-off, reducing both the computation and implementation complexity of the second focusing. If these transducers are mounted on separate devices that share a common base clock for producing the carrier frequency, a pattern clock for outputting the modulation wave can be produced. The time offset that is computed for each group can be added as a smooth warping function to the pattern clock for each grouping.

Since there are per-control point position data in the device on a per-pattern basis as has been previously disclosed (the "reduced representation"), this position information can be used to compute simple time of flight to each individual control point in real time. The result is that the interpolation nodes of the transducer activation patterns implied by each reduced control point representation are flexibly rescheduled in time slots on the device in order to arrive at the control points at the right time. This rescheduling can be achieved either per transducer or per grouping.

Each control point then has the capacity to float backwards and forward along the time line to find the position that is most suitable. Therefore, patterns that contain many control points can become split in time as different control points in the same pattern are emitted at slightly different times. The control points are then combined again in this new arrangement, resulting in sets of carrier frequency transducer activation coefficients that differ from those originally solved for. Counter-intuitively, this better preserves the "all time" assumption required by the solution for the initial transducer activation coefficients as the effects of the time coordinate for spatially localized groupings of control points has been removed. It is known that presenting spatially localized control point groupings is beneficial in that it generates a solution which provides more self-reinforcing gain than groupings that are spread out, so the validity of the control point compatibility calculations is both more important and better preserved in this case.

An important consequence of this approach is that it is then possible to employ any modulating envelope and have smooth second focusing. A pure frequency is no longer required. This may be used to create more defined parametric audio with multiple spatial targets, as well as provide clearer and more textured haptic cues with less distortion.

V. Pre-Processing of Fourier Domain Solutions in Haptic Systems

As an alternative to defining one or more control points in space, a shape defined in a 2-dimensional (2D) slice may instead be constructed in the acoustic field. This is accomplished by treating the transducer array as a holographic plate. The standard model of a holographic plate may be made to behave as an equivalent to an infinite plane of infinitesimally sized transducers. There is then a known simple solution for any given 2D complex pressure distribution that lies in a plane parallel to the plate. Building such a shape defined by complex pressure values, and convolving it with the inverted transducer diffraction integral at the given plane distance achieves this. This solution can be obtained efficiently with a 2D fast Fourier transform (FFT). Finally, using the complex-valued solution for the infinite plane, the closest real transducers in each case can be activated with a similar complex coefficient that strives to produce the same result. In this way, a physical set of transducers can then be controlled to create an acoustic field exhibiting the shape at the given distance.

One large drawback of this approach is that producing a shape instead of a set of points produces weak output and requires an infinite array. Being able to modify this technique to produce stronger output and use more realistic constraints allows this approach to bring acoustic activation of whole shapes closer to commercial viability.

A. Control Regions Relations Matrix

Prior to generating shapes using the Fourier method, a given shape nay be divided into regions. The optimal method to create "regions" of feedback is to determine when activated mutually enhance adjacent regions simultaneously can be pursued. To do so, it is imperative to consider how each region impacts the others and find a solution where they cause beneficial—and not unwanted—detrimental interference.

Similar to the control points, there are sets of simple-unit amplitude and zero-offset activation coefficients for each of the m control regions under consideration. An important difference between these activation coefficients and those involved in a discrete transducer model is that the transducers are now infinitesimal, and so the dot product sum becomes an integral.

Complex valued pressure within each region can be pre-defined to within an arbitrary reference to remove it from consideration in the solution. While there are many possible choices for this pre-definition of regions, it may be defined as real-valued or constant phase in order to function most effectively (although it may not and instead exhibit local phase variations). This pre-definition may involve defining each region as tessellating shapes, pixels, blobs, interpolation kernels or more complex shapes.

Having defined these regions (similar to control points), sets of simple unit amplitude and zero offset activation coefficients are established for each of the m control regions under consideration. To find the simple unit amplitude and zero offset activation coefficients, the next step is to solve the Fourier 2D plane shape problem for each of the m control regions. This yields a 2D function describing the holographic plate (an infinite plane of infinitesimal transducers), which in turn describes the similarities between the effects of activating each control region. The goal is then to find a configuration such that each region mutually reinforces those nearby. These "transducer activation coefficients" for each region with unit coefficient are now written as complex-valued functions:

$$\alpha_{co_1}(x,y), \ldots, \alpha_{co_m}(x,y) \qquad \text{[Equation 14]}$$

The amplitude for the individual control regions are:

$$A_{c_1}, \ldots, A_{c_m} \qquad \text{[Equation 15]}$$

If vector k is defined as:

$$k = \left[ \frac{1}{\int_{-\infty}^{+\infty}\int_{-\infty}^{+\infty} \alpha_{C0_1}(x,y) \cdot \overline{\alpha_{C0_1}(x,y)} dy\, dx}, \ldots, \frac{1}{\int_{-\infty}^{+\infty}\int_{-\infty}^{+\infty} \alpha_{C0_m}(x,y) \cdot \overline{\alpha_{C0_m}(x,y)} dy\, dx} \right],$$ [Equation 16]

then, in a similar manner as the control point relations matrix, the control regions relations matrix may be written as:

$$R = \begin{bmatrix} A_{c_1} & \cdots & \frac{A_{c_r} k_r F}{(\alpha_{C0_r}, \alpha_{C0_1})} & \cdots & \frac{A_{c_m} k_m F}{(\alpha_{C0_m}, \alpha_{C0_1})} \\ \vdots & \ddots & \vdots & \cdots & \vdots \\ \frac{A_{c_1} k_1 F}{(\overline{\alpha_{C0_1}}, \alpha_{C0_r})} & \cdots & A_{c_r} & \cdots & \frac{A_{c_m} k_m F}{(\alpha_{C0_m}, \alpha_{C0_r})} \\ \vdots & \cdots & \vdots & \ddots & \vdots \\ \frac{A_{c_1} k_1 F}{(\alpha_{C0_1}, \alpha_{C0_m})} & \cdots & \frac{A_{c_r} k_r F}{(\alpha_{C0_r}, \alpha_{C0_m})} & \cdots & A_{c_m} \end{bmatrix}$$ [Equation 17]

where $F(\alpha_{C0_p}, \alpha_{C0_q}) = \int_{-\infty}^{+\infty}\int_{-\infty}^{+\infty} \overline{\alpha_{C0_p}(x,y)} \cdot \alpha_{C0_q}(x,y)\, dy\, dx$.

It may be necessary to approximate some of these integrals, by for example restricting their domain. These integrals may also be performed in the space of a real transducer grid, effectively reducing the definition of R to the usual eigensystem. This R then becomes the eigensystem for determining the optimal coefficients to pre-multiply each region with before attempting a Fourier solution of the full shape. This matrix is a square matrix having m×m entries when m control regions are considered, so the computational time of the eigensystem evaluation depends on how many regions have been defined. Eigenvectors of this matrix then represent control region activation coefficients that result in interference such that the point amplitudes within each control region remains steady and does not create relative changes in the acoustic field. When the eigenvalue λ is large this represents a set of coefficients that promote increased gain. This is especially important when control regions are used with the Fourier solution technique.

B. Results

To evaluate this technique, a large star shape with each region occupying a pixel square was constructed by creating a bitmapped black and white image and converting white pixels into unit amplitude and phase regions. This star assumes the transducers are arranged in an infinite plane and are infinitesimal in size.

Figure 5:
FIG. 5 shows the amplitude of a star shape used to demonstrate haptic feedback in an acoustic field.
Figure 6:
FIG. 6 shows the phase of a star shape used to demonstrate haptic feedback in an acoustic field.

The amplitude of the star is shown in FIG. 5. The phase of the star is shown in FIG. 6. The known 2D FFT method has been used to produce this output with no preprocessing.

Figure 7:
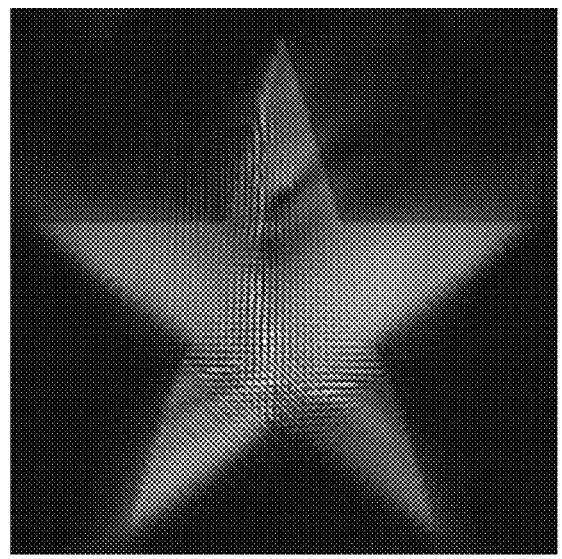
FIG. 7 shows the amplitude of the star shape used to demonstrate haptic feedback in an acoustic field after the disclosed method has been applied.
Figure 8:
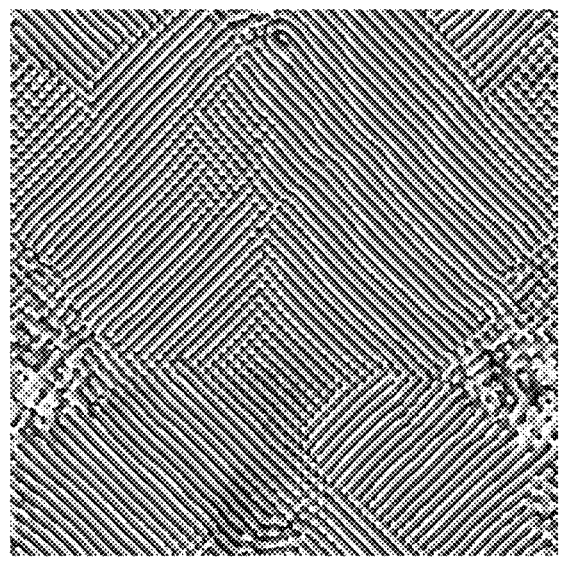
FIG. 8 shows the phase of the star shape used to demonstrate haptic feedback in an acoustic field after the disclosed method has been applied.

Next, taking into account the effects of focusing to one region has on focusing to another, the next step is to search the space using the eigensystem for a region arrangement for a more realistic candidate for reproduction in the acoustic field. After several iterations of the eigensystem and by virtue of being informed with the local effects of each regional solution, the 2D FFT solution looks quite different. The amplitude of the star using this solution is shown in FIG. 7. The phase of the star is shown in FIG. 8.

While the star has lost definition at the edges, this solution takes into account the way adjacent regions affect each other. This solution will exhibit much higher fidelity when applied to a real transducer system than the constant phase solution or a solution that has not been chosen in this way. This is because the structure of the transducer array and the interactions between the acoustic fields produced by each individual transducer as well as the effect adjacent regions have on each other have all been accounted for in the matrix formulation.

VI. Dynamic Solution Space Sampling

In an acoustic field, one or more control points can be defined. These control points can be amplitude-modulated with a signal and as a result produce vibrotactile feedback in mid-air. An alternative method to produce feedback is to create control points that are not modulated in amplitude and instead move them around spatially to create spatio-temporal modulation that can be felt. In either event, the acoustic field changes in space and time must be smooth in order to prevent audible noise. Since this constrains the behavior of valid states of the system, high-resource direct calculation techniques can be replaced by perturbations from the previous state to drive down the resources need for calculations. This is especially important in embedded systems, where computer processing resources are a scarce resource.

A. Control Point Paths as Perturbed Solutions

Creating a point and moving it without modulating in amplitude may haptically actuate a path in the air. If moving this point is to be made quiet, the point has to change the acoustic field by a small delta each time. The implication is that to do so, the point must make small enough distance increments when it moves in order to make the apparent motion smooth. This means that the phase and amplitude from any one transducer must also approximate a smooth curve, which implies a number of possibilities regarding perturbative techniques.

B. Perturbed Distance, Amplitude and Sampling Calculations

When calculating the simple time-of-flight from a transducer midpoint at p, to a focus point at $\chi_t$ at sample time t, the distance must be calculated if the phase and amplitude will not be determined via look up table. Defining the vector between these as $\Delta_t = p - \chi_t$, there are two quantities to determine to obtain the phase and angle-dependent amplitude. The phase can be determined as a multiple of $\sqrt{\Delta_t \cdot \Delta_t}$, which contains a square root. Square roots are difficult to calculate in embedded hardware, as there is no direct approach for evaluation. As an alternative to using a more direct approach to obtain the solution such as polynomial evaluation, a Newton-Raphson or other iterative approach can be used instead. However, due to the perturbative nature of the solution, the result of the previous calculation $\sqrt{\Delta_{t-\delta} \cdot \Delta_{t-\delta}}$, can be used to seed the next square root approximation. Assuming that the movement is continuous in time, the quantity $\sqrt{\Delta_t \cdot \Delta_t} - \sqrt{\Delta_{t-\delta} \cdot \Delta_{t-\delta}}$ will be small enough for it to converge quickly, needing only a small fraction of the iterations required by an unseeded calculation. This saves compute time, enabling the decompression of the reduced representation states to proceed much more quickly than before. Equivalently, similar methods can be used to avoid other instances of resource-consuming operations. Other such calculations can similarly benefit so long as these quantities are connected to the continuity of the phase space. This allows evaluations such as $$\frac{1}{\Delta_t \cdot \Delta_t}$$

required to determine amplitude or $$\frac{1}{s_t}$$

required to describe sampling delta to be refined using other less resource-intensive arithmetic operations. In many of these cases, the full iterative procedure would have previously been uneconomical, involving more computing power than simply committing to the expensive but supported operation.

Figure 9:
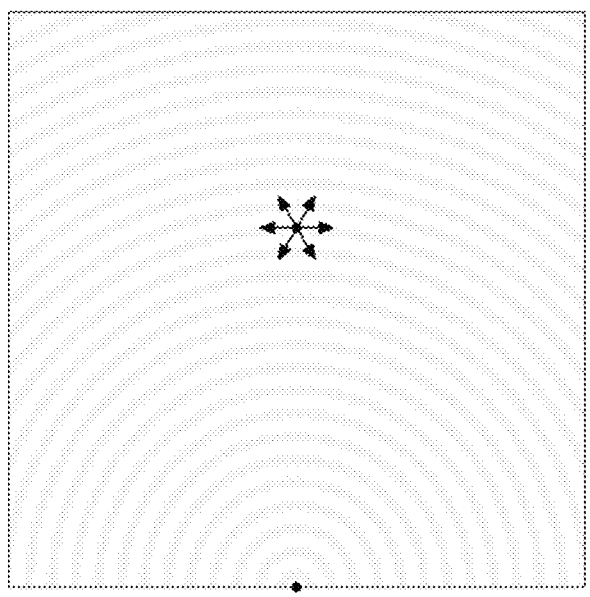
FIG. 9 is a diagram of the output of a single transducer from the perspective of a single focus point.

C. Dynamic Sampling,

FIG. 9 shows a diagram of the output of a single transducer (shown as a large dot on the bottom of the figure) from the perspective of a single focus point. Moving a focus point a fraction of a wavelength in any direction will only produce a known upper bound on distance change. This also implies a upper bound on phase change required to focus to the point.

Focus points which are moved in the air modify the activation coefficients at the transducers. If the focus point is moved away or towards the transducer by half a wavelength, roughly speaking x is added to or subtracted from the phase exhibited by that transducer. If the focus point stays at a constant distance or is moving parallel to the acoustic wave front, then that phase will barely change upon movement. When interpolating between known points in the solution space in the complex plane representing two stages in the temporal evolution of a focus point a small distance spatially apart (say t and t+δ), a worst-case focusing error can be estimated that reveals how far the interpolation is from the linear travel of the focus point. This error decreases quickly as the distance between the adjacent focal point snapshots shrinks to less than half a wavelength. Taking this further, if reduced representation samples of the solution space to the device are sent, an acoustic field CFL-like stability condition may be defined based on increments of the spatial distance a focus point has traveled and not on temporal behavior. (In mathematics, the Courant-Friedrichs-Lewy (CFL) condition is a necessary condition for convergence while solving certain partial differential equations (usually hyperbolic partial different equations) numerically by the method of finite differences.)

The CFL-condition essentially describes how fast the system can be moved: a hyperbolic PDE system cannot be moved in a single step faster than a speed defined by the grid spacing or the errors can propagate and become potentially infinite. Thus, if a control point is moving along a path, an error-bound condition that is similar to the CFL condition may be calculated representing the maximum distance (typically this will be less than a wavelength) that can be moved in a single step while keeping the worst-case error below a threshold. It is then possible to compute (any or all of) the solver results (z vector)/eigensystem result/transducer activations (x vector) for the control points at these step points along the trajectory and interpolate between the results for each step to get the control points at any points in between, safe in the knowledge from the outset that worst case error bound is known for any of the transducer coefficients that are produced at the end of the process.

Then, using the condition that states sent to the device must be focusing to points that are not more than a certain distance apart, it is ensured that the requirements for the perturbed solutions of the distance and other arithmetic quantities are met while reducing the necessity to sample the solution space periodically in time.

Figure 10:
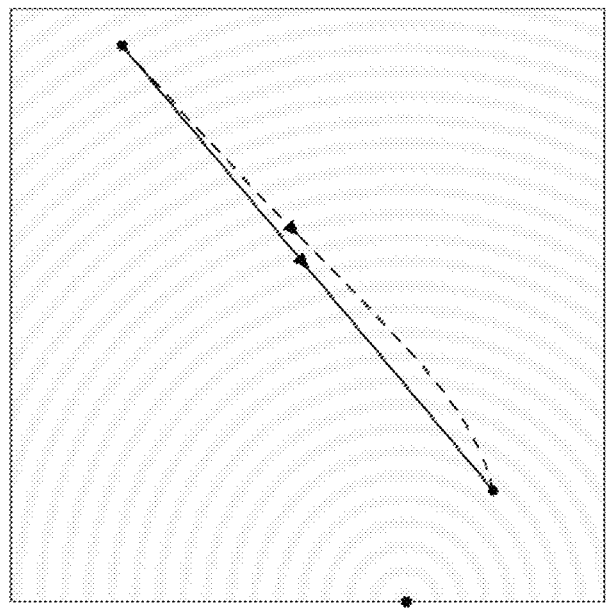
FIGS. 10 and 11 show the interpolation for a single transducer between two states.
Figure 11:
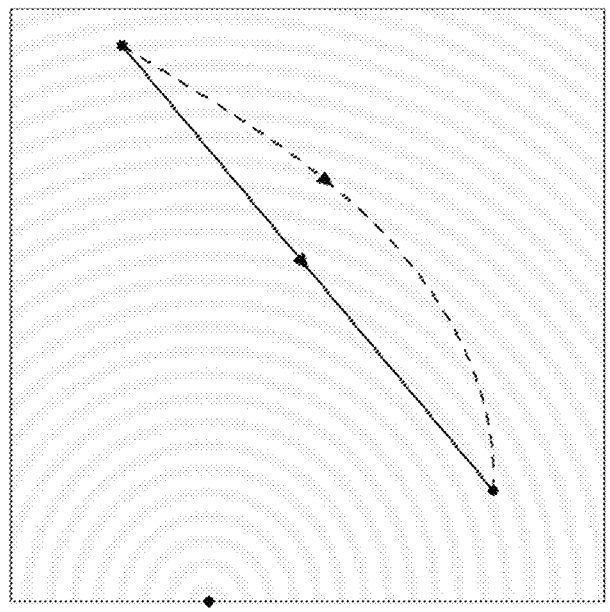

D. Polynomial Sampling,

FIGS. 10 and 11 show the interpolation for a single transducer (shown as a large dot on the bottom of each figure) between two states, where the dashed line is the linear interpolation in distance. The acoustic field lines from each transducer affect the dashed line. Curvature changes between transducers for the dashed line causes defocusing in intermediate interpolated states. Using a high order polynomial can make the state follow the solid line, which preserves the focusing effect.

This approach can be taken still further. The limiting part of the previously described stability condition is that the state interpolation is conducted in the complex space. If this were to be relocated to a distance/amplitude space, while less accessible due to space conversions, the amount of defocusing would be reduced. However, relocating to a distance/amplitude space can be further augmented by creating higher order polynomial curves that described the change of the amplitude and distance of the transducer as the focus point moves through the field on some linear or polynomial trajectory. As the distance value is readily translated into a phase, creating linear or polynomial segments between the states in reduced representation becomes possible with very little defocusing along the path. This in turn enables further reductions in the device state update rate required to describe complex shapes. This can be achieved by, for instance, calculating gradients or performing a series expansion that converges on the correct path in the limit. It may also be helpful to use a weighted blending of two functions, one that represents the starting point exactly and approximates the interval and one that represents the end point exactly and approximates the interval. In this way, a function that gives a good approximation for the central interval may be created while still being exact on the beginning and ending points.

VII. Conclusion

The various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   i) producing an acoustic field from a transducer array having known relative positions and orientations, wherein the acoustic field comprises a carrier wave and a modulated wave and wherein the carrier wave has a plurality of modulated focal areas;
   ii) defining a plurality of control points wherein each of the plurality of control points has a known spatial relationship relative to the transducer array;
   iii) focusing the carrier wave and the modulated wave at the plurality of control points by segmenting the plurality of control points in a plurality of regions that fit within the plurality of the modulated focal areas;
   wherein the acoustic field is produced by a mid-air haptic feedback system; and
   wherein the each of the plurality of regions have a radius of approximately half a wavelength of the frequency of the modulation wave.

2. The method as in claim 1, wherein focusing the carrier wave and the modulated wave at the plurality of control points by segmenting the plurality of control points in a plurality of regions that fit within the plurality of the modulated focal areas further comprises calculating phase offsets of the modulated wave at the plurality of modulated focal areas.

3. The method as in claim 2, further comprising generating an audible sound within at least one of the plurality of control points.

4. A method comprising:
   i) producing an acoustic field from a transducer array, the transducer array comprising a plurality of transducers having known relative positions and orientations;
   ii) defining a plurality of control points wherein each of the plurality of control points has a known spatial relationship relative to the transducer array; and
   iii) maintaining the focus of the plurality of control points that are in motion by using a Courant-Friedrichs-Lewy stability condition as an error bound condition based on the spatial distance travelled by the plurality of control points.

5. The method as in claim 4, wherein the acoustic field is produced by a mid-air haptic feedback system.

* * * * *